United States Patent [19]

Anderson et al.

[11] Patent Number: 5,535,984
[45] Date of Patent: Jul. 16, 1996

[54] SAFETY COUPLER LOCKING MEANS

[75] Inventors: Todd W. Anderson, Cincinnati; Richard L. Fahl, Fairfield, both of Ohio

[73] Assignee: Dover Corporation, New York, N.Y.

[21] Appl. No.: 255,235

[22] Filed: Jun. 7, 1994

[51] Int. Cl.⁶ ..................................................... F16L 37/20
[52] U.S. Cl. ........................... 251/149.9; 285/18; 285/312
[58] Field of Search ................................. 251/149.9, 243, 251/149.6; 285/18, 311, 312

[56] References Cited

U.S. PATENT DOCUMENTS

4,030,524  6/1977  McMath et al. ................. 251/149.9 X
4,575,130  3/1986  Pemberton et al. ................. 285/312 X
5,060,982  10/1991  Matsushita ........................... 285/312 X

*Primary Examiner*—Kevin Lee
*Attorney, Agent, or Firm*—Kinney & Schenk

[57] ABSTRACT

An elbow coupler includes a linkage for locking the coupler to an adapter. The linkage has a resilient, laterally deflectable link that limits the forces applied to the linkage thereby preventing the components of the linkage from being overstressed. A spring loaded, blocking sleeve prevents the coupler from normally remaining upright on an adapter, unless it is locked thereon through use of the locking linkage. A flapper valve is interconnected with the blocking sleeve to the end that the valve is normally closed and then opened when the coupler is locked onto an adapter.

20 Claims, 6 Drawing Sheets

SAFETY COUPLER LOCKING MEANS

The present invention relates to couplers that interact with adapters in connecting fluid conduits and more particularly to safety locking means for minimizing, if not eliminating the possibility of fluid leakage.

The present invention is motivated by needs of the petroleum fuel industry and more specifically in the delivery of fuel from a mobile fuel tanker to an underground fuel tank. The specific end sought is to minimize, if not eliminate, the possibility of a fuel spill occurring during the process of filling an underground storage tank. It is to be understood, however, that in responding to the needs of the petroleum fuel industry, the solutions provided have utility where other fluids are involved.

It is an accepted practice to provide what is referenced as a containment device into which a vertically disposed, stand pipe, from an underground storage tank, projects. The containment device is, in effect, a shallow man hole, permitting the stand pipe terminating below ground level. The upper end of the stand pipe (also referenced as a fill pipe or riser pipe) is provided with an adapter, on which a cap closure is normally mounted. Likewise the upper end of the stand pipe is normally closed by a lid, disposed at ground level.

When fuel is to be introduced into the storage tank, the containment device lid and the stand pipe cap are removed. A coupler is then attached to the adapter to connect a fuel conduit from a tanker truck thereto. There is an accepted, standard design for the adapter, which includes a circumferential groove that receives, on opposite sides, arms, or lugs.

An effective form of coupler, of the type referenced, is the subject U.S. Pat. No. 4,575,130, which is of common assignment with the present application. The referenced coupler is in the form of an elbow and comprises a pair of arms that are pivotally mounted on the body of the coupler and have rollers mounted on their free ends. A linkage mechanism connects these arms to an operating lever, that is positioned above ground level. The operating lever is swung to pivot the arms and bring the rollers into locking engagement with the adapter groove.

While highly effective, when properly used, the referenced coupler, and other couplers of similar design, become ineffective when subject to abuse. This is to say that debris in a containment device can interfere with locking movement of the coupler arms. The operating lever for this type of coupler, partly because of being disposed at a relatively low height permitting an operator to bring his full body weight into play, exerts high forces on the linkage mechanism and locking arms. Thus, when there is any interference with their movement, as by debris, the high forces frequently result in some portion of the locking mechanism breaking or being deflected and permanently bent. As a result of such abuse the operating lever can be swung to a position that normally indicates the locking arms are in a locking position, when, in fact, only one or neither, of the locking arms is in a locking position.

It is also to be appreciated that, at times, either because of problems encountered in swinging the operating lever to a locking position, the coupler will be positioned on an adapter, with no locking action whatsoever. A careless operator could then wrongly assume that the coupler was locked on the adapter, simply because it was in an upright position. Based on such incorrect assumption, the operator could then initiate delivery of fuel into the tank, when the coupler was not locked on the adapter.

In the past, the lack of a positive locking force between such couplers and adapters was a serious problem, but not one that necessarily involved drastic environmental hazards. This is to point out that, in normal delivery of fuel, there is a neutral to negative pressure at the coupler/adapter connection. The normal practice is to deliver no more fuel through the tanker conduit and the stand pipe, than can be accommodated by the storage tank. Thus, where there is a failure to obtain a sealed connection between a coupler and an adapter, there would be only a minimal loss of fuel and that spilled fuel could normally be safely confined within the containment device.

Should there be an attempt to load an amount of fuel into a storage tank that exceeds available capacity, then the excess fuel would first fill the containment device. If the operator were alert, he would observe fuel entering the containment device and have sufficient time to shut off flow of fuel from the tanker with little or no uncontrolled spillage of fuel.

In recent years, there has been an increasing use of overfill valves, that are mounted in the storage tank. The usual operation of such valve is to instantaneously shut off flow of fuel through a stand pipe, once the fuel in the tank reaches a predetermined level. The rapid closing of this overfill valve produces a water hammer effect that produces a high separation force between the coupler and the adapter. If one or both of the coupler locking arms are not properly engaged with the adapter groove, the coupler can separate from the adapter. The force of separation can be so great that the coupler is thrown out of the containment device and fuel is immediately spewed onto the ground.

Where a coupler is thus thrown out of a containment device, while discharging fuel, a hazardous condition is created instantaneously. Not only is there a fire/explosion hazard, there can be a very significant environmental impact, as fuel is free to enter and contaminate adjacent ground soil, enter storm sewers or otherwise adversely affect the environment. In addition to all of these undesirable consequences there is the further possibility of financial penalties by governmental authorities.

With the foregoing in mind, one object of the present invention is to minimize, if not prevent, spilling of fuel during the filling of an underground fuel tank.

Another object of the present invention is to minimize, if not eliminate, abuse to the operating components of a coupler, which would prevent a sealed connection from being obtained.

A further object of the present invention is to prevent the delivery of fuel from a connecter when it is not properly mounted on an adapter.

Yet all other object of the present invention is to make apparent a condition in which a connector is not properly mounted on an adapter.

The foregoing ends may be broadly attained by a coupler comprising a tubular housing, the lower end of which is adapted to be telescoped over an adapter. Coupler locking means, mounted on opposite sides of the tubular housing, lockingly engage the locking groove of the adapter. Linkage means bring the coupler locking means into and out of locking engagement with the locking groove. The linkage means include an operating lever displaceable between a first position in which the coupler locking means are disengaged from the locking groove and a second position in which the coupler locking means are engaged with the locking groove.

The ends of the invention are more specifically achieved by the linkage means including yieldable, resilient means for permitting the operating lever to be moved to its second position when the coupler locking means is blocked from engaging the locking groove of the adapter. The yieldable, resilient means limit the stresses on the leakage means below a level which would curtail the working life of the linkage means.

The coupler locking means may comprise a pair of pivotally mounted arms and the operating lever may be pivotally mounted on the housing. The linkage means may further include a pair of links extending, respectively, from the pivotally mounted arms, into overlapping relation, at one side of the housing. A longitudinal link extends between the operating lever and the overlapped portions of said pair of links. The longitudinal link is stressed in compression when the operating lever is swung from its first to its second position.

Preferred features of the invention are found in that the longitudinal link has a predetermined, maximum column strength sufficient to displace the pair of links and swing the arms into locking engagement with the locking groove of the adapter, in response to movement of the operating lever from its first to its second position, when there is no impediment to either of the arms being swung into locking engagement with the adapter groove. The longitudinal link is laterally deflectable when the compression force thereon exceeds the column strength of the longitudinal link. Thus, the maximum forces on the linkage means is limited to a finite value in the event one of the pair of arms is not free to be swung into locking engagement with the locking groove. Additionally, the components of the linkage system proportioned so that they are not overstressed when subject to said finite maximum value forces.

The ends of the invention may also, in accordance with other aspects of the invention, be achieved through a coupler, of the type ascribed, in which the linkage means include a connecting link, that is loaded in compression as the operating lever is moved from its first to its second position.

A feature of the invention is found in the connecting link having a limited column strength. When the compression force on the connecting link exceeds its column strength, the connecting link deflects laterally, thereby limiting the forces that can be transmitted through the linkage means to a predetermined, maximum value. Further, the connecting link, when deflected, is stressed within its elastic limit. The linkage means also stressed within their elastic limits when stressed by the predetermined maximum value forces. Thus, if the operating lever is moved from its first to its second position, when the locking means is blocked from movement into locking engagement with the adapter locking groove, the linkage system remains operable.

Preferably, the connecting link is compositely formed, and is comprised of a plurality of link plates. Advantageously, the link plates are formed of spring steel having a small thickness compared to their widths and lengths. Also the link plates are disposed in side by side relation, with their adjacent surfaces being contiguous. An additional feature is found in the link plates being initially curved to a small extent sufficient to assure that all will be deflected in the same direction, when the compression force thereon exceeds the column strength of the connecting link.

Another feature of the invention is found in the provision of stop means for preventing the operating lever from being moved substantially beyond its second position, to thereby limit the extent to which the connecting link can be deflected laterally.

In accordance with other objects, the ends of the invention may be achieved by a coupler, as generally ascribed above, and in which a counterbore is provided in the lower end of the coupler housing to receive an adapter. The locking arms are pivotally mounted in diametrically opposed relation on the lower end of the housing, with each arm having a roller mounted at its free end. The arms have generally upright, locking positions in which the rollers engage a downwardly facing surface of the adapter groove, when the housing is in a fully telescoped position relative to said adapter, and, further, force the coupler housing downwardly, with respect to the adapter.

The ends of the invention are more specifically attained through the provision of a blocking member reciprocable within said counterbore. Spring means urge the blocking member to a blocking position preventing the housing from being telescoped over the adapter to an extent sufficient for the coupler to freely maintain an upright position, under the force of only the weight of the coupler. The spring means are yieldable to permit the housing to be displaced to its fully telescoped position, in response to a downward, manual force on the coupler.

An additional feature, preferably employed in combination with the referenced blocking means, is found in the provision of valve means having an open position permitting flow of liquid through said housing, and a closed position preventing flow of liquid through said housing. Means are provided for maintaining the valve means in its closed position when the coupler locking means is not in locking engagement with the locking groove of an adapter and for displacing the valve means to its open position when the coupler locking means is in locking engagement with the locking groove of an adapter. Advantageously the last mentioned means are provided through an interconnection with the blocking means.

Other features of the invention are found in the blocking member being in the form of an annular member disposed in the housing counterbore. The annular blocking member sealingly engages an upper, radial end face of the coupler and the base of housing counterbore, when the locking arms are in their generally vertical, locking positions, to thereby provide a sealed connection between the housing and the adapter.

Additionally a tubular sleeve may be slidably mounted in the lower end of the housing, and be provided with an outwardly projecting flange, at its lower end, that serves as the blocking member. Additionally this flange sealingly engages an upper, radial end face of the adapter, and the base of said counterbore, when the locking arms are in their generally vertical, locking positions, to thereby provide a sealed connection between the housing and the adapter.

Other features of the invention are found in the housing being compositely formed and comprising an upper portion and a lower portion, with the counterbore being formed in the lower end of the lower housing portion. In this combination, an annular valve seat is disposed at the juncture between the upper and lower housing portions. A flapper valve, pivotally mounted at the juncture between the housing portions, has a closed position in which the flapper valve engages the valve seat and prevents flow of liquid through the housing and a fully open position in which it is disposed to one side of the passage. Interconnecting means between the sleeve and the flapper valve position the flapper valve in its closed position when the sleeve flange is in its blocking position, and position the flapper valve in its fully open position when the sleeve flange is in its fully telescoped position.

The spring means, for the blocking means, preferably comprise a compression spring disposed between an upper, annular face on the sleeve and a lower surface of the valve seat. Also the means interconnecting the sleeve and the flapper valve preferably comprise a link pivotally connected to the lower surface of the flapper valve, and a pin, spanning said sleeve, to which the link is pivotally connected.

As will become more apparent from the later portions of this description, various features may be used alone or in combination with each other.

The above and other related objects and features of the invention will be apparent from a reading of the following description of a preferred embodiment of the invention, with reference to the accompanying drawings, and the novelty thereof pointed out in the appended claims.

Figure 1:
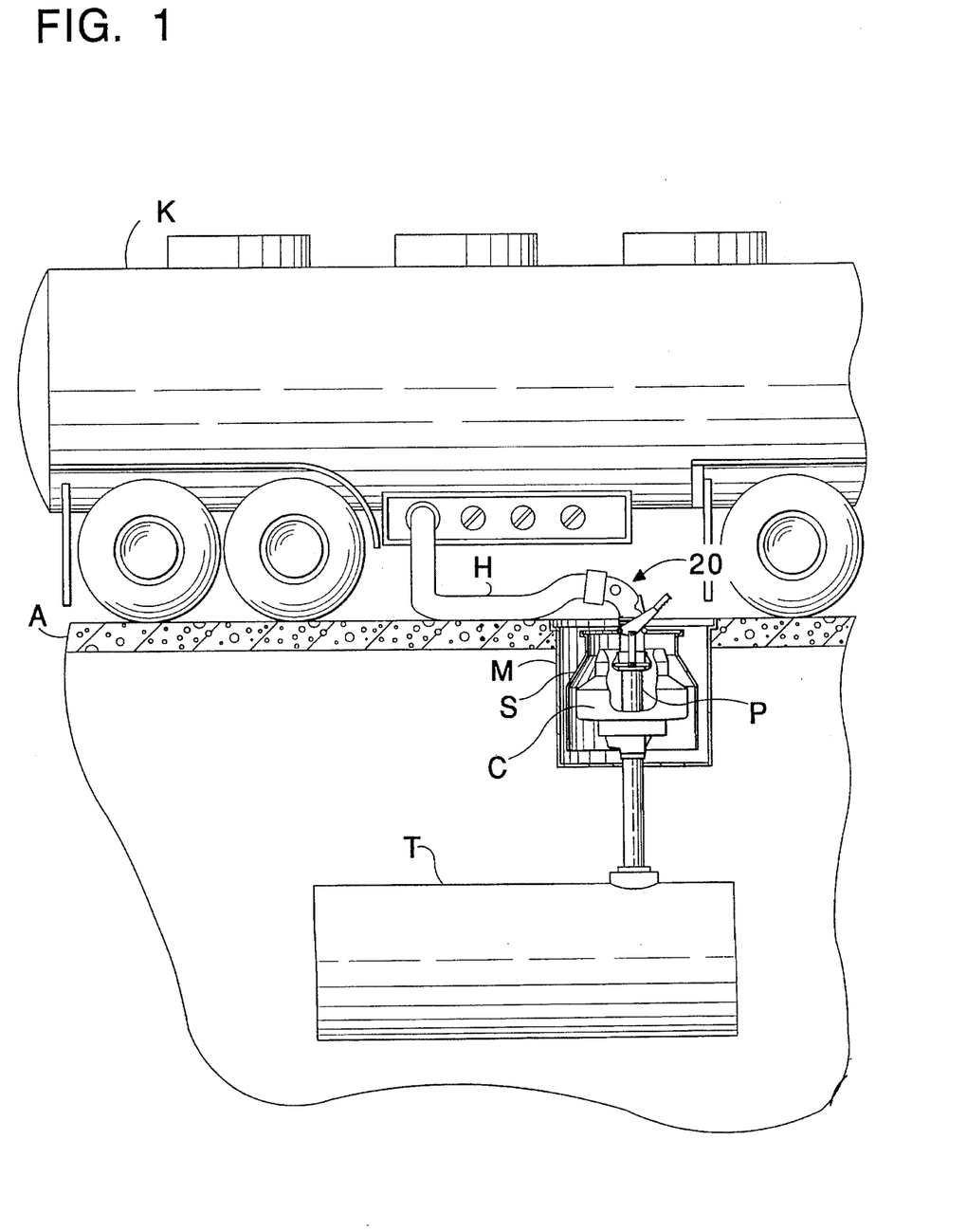
FIG. 1 is an elevation, partly in section, illustrating the manner in which the present invention is employed in the filling of an underground storage tank.

FIG. 1 illustrates a primary environment in which the present invention is employed, namely in filling an underground fuel storage tank T, that underlies a concrete apron A. The tank T is filled by way of a stand pipe P that projects upwardly and terminates in a containment unit C. The containment unit C is disposed within a protective shield S, which, in turn, is disposed in a manhole M. The tank T is filled from a vehicle propelled tanker K, that is positioned on the apron A adjacent the manhole M.

The manhole M, the protective shield S and the containment unit C may each have a lid that would be removed to provide access to the interior of the containment unit, when it is desired to fill the tank T. Further, the upper end of the stand pipe p is normally closed by a cap (not shown) that would be removed to permit connection of an elbow coupler 20 to the stand pipe p. The coupler 20 thus connects a hose H to the stand pipe P for delivery of fuel from the tanker K to the underground storage tank T.

Figures 2, 3:
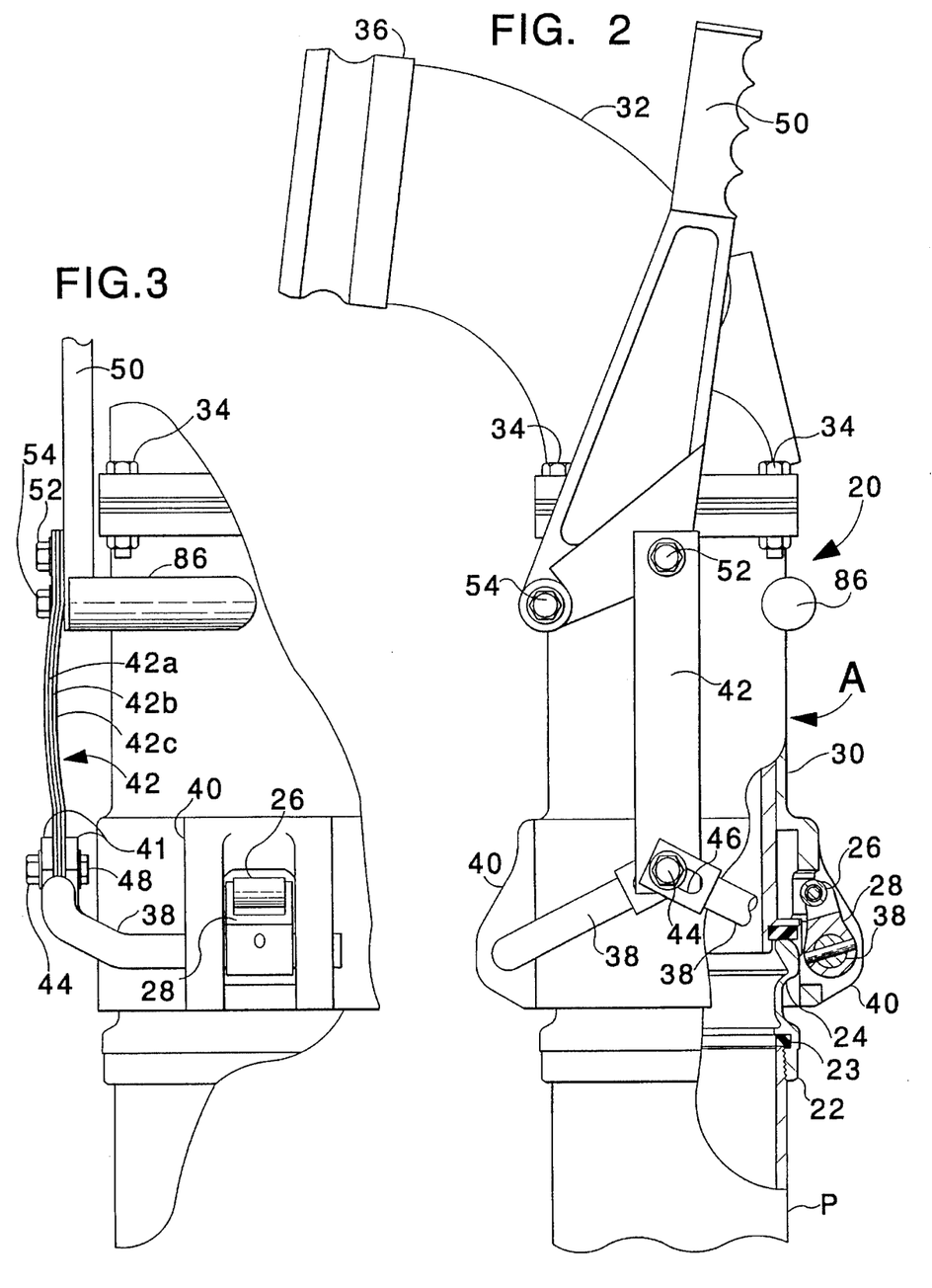
FIG. 2 is an elevation, partially in section, illustrating, in greater detail, the coupler of the present invention positioned to be mounted on a stand pipe, through a standard adapter.
FIG. 3 is a view looking in the direction of arrow A in FIG. 2.

Referring next to FIGS. 2 and 3, it will be seen that stand pipe P has, at its upper end, a tubular adapter 22 threaded thereon, with a gasket 23 provided to assure a sealed connection therebetween. The adapter is of a standard configuration and includes a circumferential groove 24, which is to be engaged by a pair of diametrically opposed, rollers 26, mounted on arms 28, in locking the coupler 20 on the adapter 22 and stand pipe P.

The coupler 20 comprises a lower, tubular, flow defining housing 30 and an upper flow defining housing 32, which are secured in assembled relation by bolts 34. An adapter 36 may be provided at the upper end of the housing 32 to facilitate connection of the hose H to the compositely formed, elbow coupler.

Figure 8:
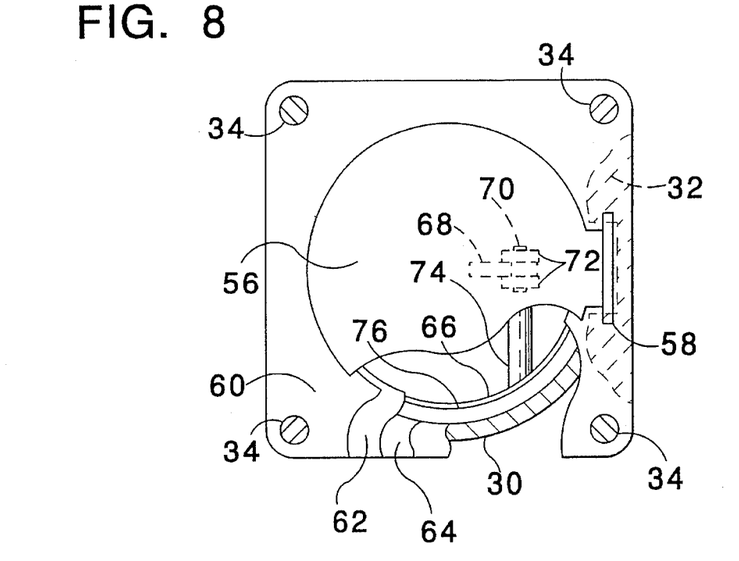
FIG. 8 is a section taken generally on line 8—8 in FIG. 4.
Figure 9:
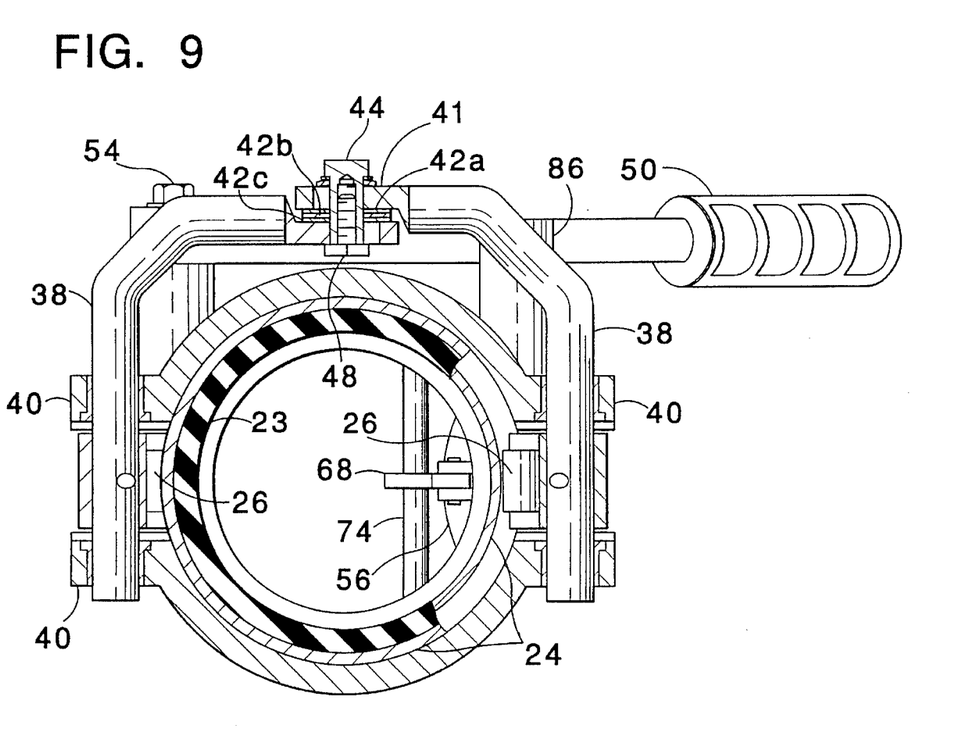
FIG. 9 is a section taken generally on line 9—9 in FIG. 7.

Each of the arms 28 is mounted on a curved link 38. Each of these links is pivotally mounted on a pair of housing lugs 40, with the arm 28 thereon, being disposed between the lugs and positioned to swing through an opening in the housing to bring the roller into engagement with the adapter groove 24. The curved links 38 have flattened end portions 41, at their free ends, that are disposed in overlapping relation, on opposite sides of a longitudinal, vertical link 42. The link end portions 41 are in slidable/pivotal relation with the link 42, by way of a pivot pin 44 (see also FIG. 8) that extends through slots 46 in the end portions 41 and a hole in the lower end of the link 42. A screw 48 (Reference FIG. 9) maintains the links 38 in assembled relation on the link 42.

The upper end of the link 42 is pivotally connected to an operating lever 50 by a shoulder screw 52. The operating lever 50 is, in turn, pivotally mounted on the housing 30 by a shoulder screw 54. This linkage provides a highly effective means for swinging the arms 28 to bring the rollers 26 into locking engagement with the adapter groove 24. Thus, when the lever 50 is swung from the generally vertical position of FIG. 2, to the angled position of FIG. 5, the link 42 is lowered, the curved links 38 are swung inwardly with a highly leveraged force to rotate the arms 28 and bring the rollers 26 into locking engagement with the groove 24.

As thus far described, the linkage arrangement for swinging the arms 28 is essentially the same as in the above referenced U.S. Pat. No. 4,575,130. As will be later described in detail, this linkage has been modified to prevent damage to the linkage components when there is some obstruction that prevents the rollers from being brought into locking engagement with the adapter groove 24.

The coupler 20 further comprises a flapper valve 56, which is pivotally mounted relative to the coupler flow passage by pintles 58 (see also FIG. 8) that project laterally into recesses formed in the upper housing 34. The flapper valve 56 overlies and is adapted to sealingly engage a gasket 60. The gasket 60 overlies and is supported by an apertured plate 62. A further gasket 64 is then disposed between the plate 62 and the upper end of the housing 30. The gasket 60, plate 62 and gasket 64 are clamped between the upper and lower housing 32, 30 by the bolts 34.

A sleeve 66 is slidably mounted in the lower end of the coupler housing 30. A link 68 is pivotally mounted on a pin 70 that spans a pair of lugs 72 on the undersurface of the flapper valve 56. The lower end of the link 68 is pivotally connected to a pin 74 that spans opposed portions of the sleeve 66. A spring 76 acting between the plate 62 and the sleeve 66 urges the sleeve in a downward direction to a position limited by engagement of the flapper valve 56 with the sealing gasket 60. The flapper valve is thus normally maintained in a closed position, preventing flow of fuel through the coupler 20 past the juncture of the housings 30, 32.

It will also be noted that the sleeve 66 has an outwardly projecting flange 78 that projects into an enlarged bore 79 at the lower end of the housing 30. A sealing gasket 80 is mounted on the sleeve 66 beneath the flange 78. The sealing gasket 80 is adapted to sealing engage the upper end surface of the adapter 22 to effect a seal between the adapter 22 and the sleeve 66.

Operation

In effecting a connection between the coupler 20 and the adapter 22, the coupler is manually positioned generally as indicated in FIGS. 1 and 2.

It will first be noted that, contrary to prior art practice, the coupler cannot be positioned on the adapter 22/stand pipe P, unless it has been locked thereon by proper engagement of the rollers 26 with the adapter groove 24. This is to point out that the lower end of the sleeve 66 blocks entrance of the adapter into the coupler housing 30. Thus, if the coupler is manually rested on top of the adapter 22 and then released, it will, in most cases, immediately fall to one side and, also, it is likely that the coupler will fall out of the containment device C and the man hole M.

It is also to be noted that should the coupler balance itself in an upright position, or should an operator be grossly negligent, and ignore the fact that the coupler is not in an upright position, there can be no uncontrolled spilling of fueling upon opening of the valve in the tank truck. This is to point out that the flapper valve 56 is maintained in a closed position until the coupling is properly locked onto the adapter. Should flow of fuel be initiated when the coupler is not connected to the adapter, there is only the problem of disposing of the limited amount of fuel in the hose H. This is a relatively simple matter to deal with, compared to an uncontrolled spillage of multiple gallons of fuel onto the ground.

Actually, in most instances there is no problem disposing of fuel trapped in the hose H, upstream of the flapper valve 56. The coupler housing 30 can be properly aligned with the adapter 22 and then manually depressed to open the flapper valve. If the valve at the truck has been closed, the trapped fluid simply goes into the underground tank. If the underground tank, and its fill pipe are completely filled, it might be necessary to wait until a sufficient amount of fuel had been pumped from the tank, before emptying the fuel trapped above the coupler valve 56.

Figure 4:
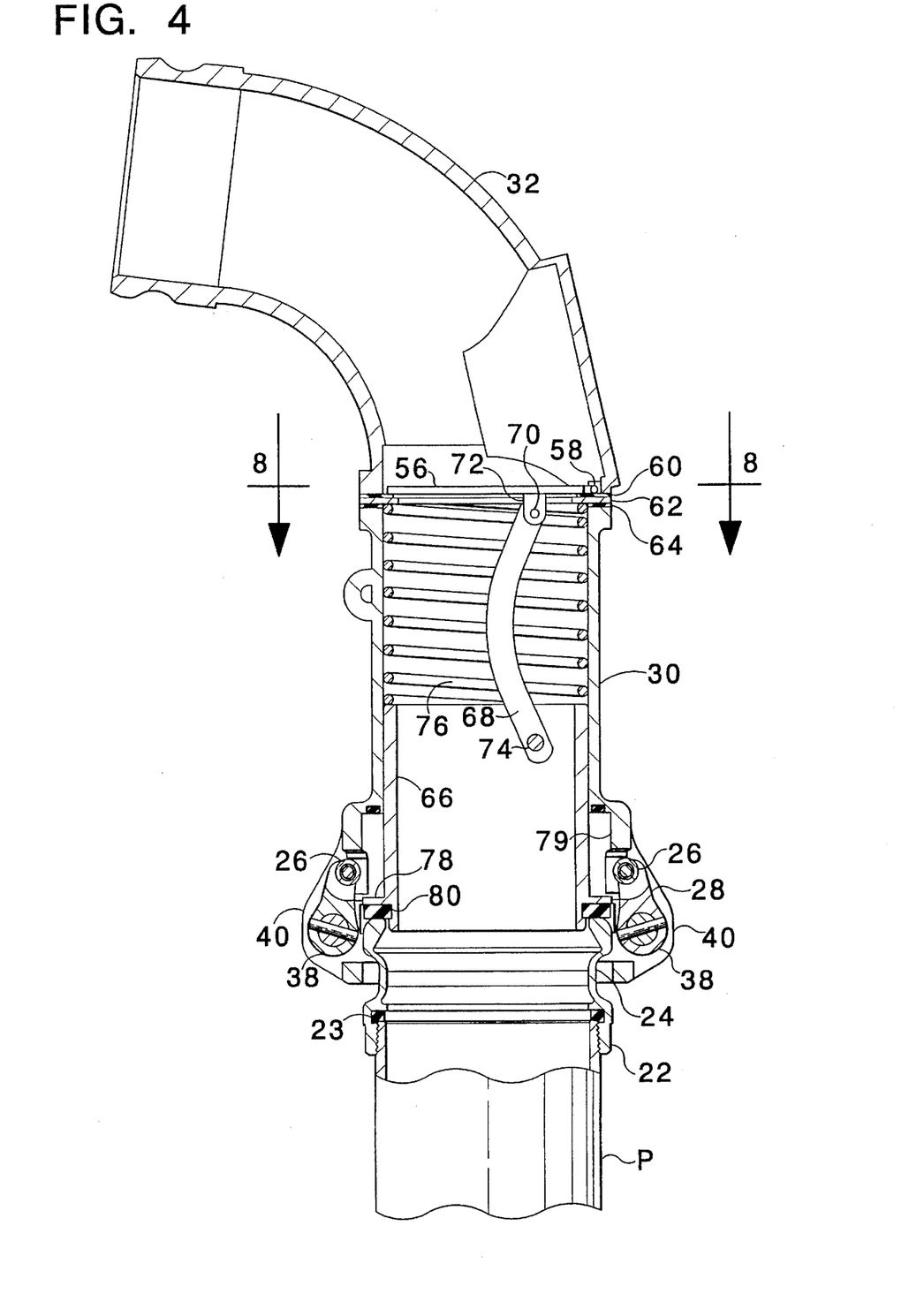
FIG. 4 is an elevation, in full longitudinal section, of the present coupler positioned for mounting on the adapter.

In normal use, the coupler 20 is positioned generally as indicated in FIGS. 2–4. The operator then exerts a downward force on the coupler to cause the housing 30 to be telescoped over the adapter 22, as the upper end of the adapter engages the sealing ring 80. The housings 30, 32, and particularly the pivotal mounting for the flapper valve pintles 58, thus move downwardly with respect to the sleeve 66 and the linkage pin 74, as the spring 76 is compressed. This movement causes the flapper valve 56 to pivot to an open position in which the flapper valve is disposed in a recess 82 formed in the upper housing 32. It will be noted that, when positioned in the recess 82, the flapper valve is disposed to one side of the fuel flow path, so that there is a minimum of flow losses that would limit the rate of flow through the coupler.

The coupler 20 is thus lowered to a position in which the rollers 26 are generally aligned with the adapter groove 24. When the coupler 20 is so positioned, the lever 50 is then pivoted downwardly to the position of FIG. 5. This movement of the lever 50 displaces the link 42 downwardly and swings the curved links 38 downwardly to generally horizontal positions. The arms 28 are thus swung inwardly, causing the rollers 26 to engage the upper, curved surface of the locking groove 24. The upper end of the adapter 22 is forcibly engaged with the sealing gasket 80, as the sleeve flange 78 is forced against the inner end of the bore 79 in the housing 30. An O-ring 84 provides a fluid seal between the housing 30 and the sleeve flange 78.

As previously noted, the locking action, attained through the linkage mechanism that engages the rollers 26 with the locking groove 24, is essentially the same as in the above-referenced U.S. Pat. No. 4,575,130, excepting that it accommodates the sleeve 66, which provides the improved functions above described.

The described linkage differs from the referenced, earlier linkage in that it incorporates means for maintaining the functional integrity of the linkage components in the event one or both of the rollers 26 can't be seated in the locking groove 24.

To this end the link 42 provides a yieldable, resilient connection between the lever 50 and the curved links 38. More specifically, and in a preferred form, the link 38 is formed so that it has a limited column strength. That is, when the downward, compression loading on the link 42 exceeds a given value, the link 42 deflects laterally.

To provide an example, assume that the coupler 20 is not fully seated on the adapter 22 and that the large diameter of the upper end of the adapter is aligned with the rollers 26. If the lever is then swung toward the position of FIG. 5., pivotal movement of the arms 28 and curved links 38 is blocked by engagement of the rollers 26 with the enlarged diameter at the upper end of the adapter 22. With the yieldable characteristic of the link 42, the lever 50 can be fully swung to its locking position of FIG. 5, without damage to any of the components of the linkage. This is point out that, by limiting the column strength of the link 42, the forces on all components of the linkage system are limited to a predetermined maximum value. This maximum value is, of course, sufficient to assure that the torque force on the arms 28 will cause the rollers 26 to lockingly engage the groove 24. However, by establishing a finite, maximum force for the linkage system, it is possible to size the components of the linkage (the several pivot pins, links, etc.) so that they will not be stressed beyond their elastic limits (i.e., overstressed).

Figures 5, 6:
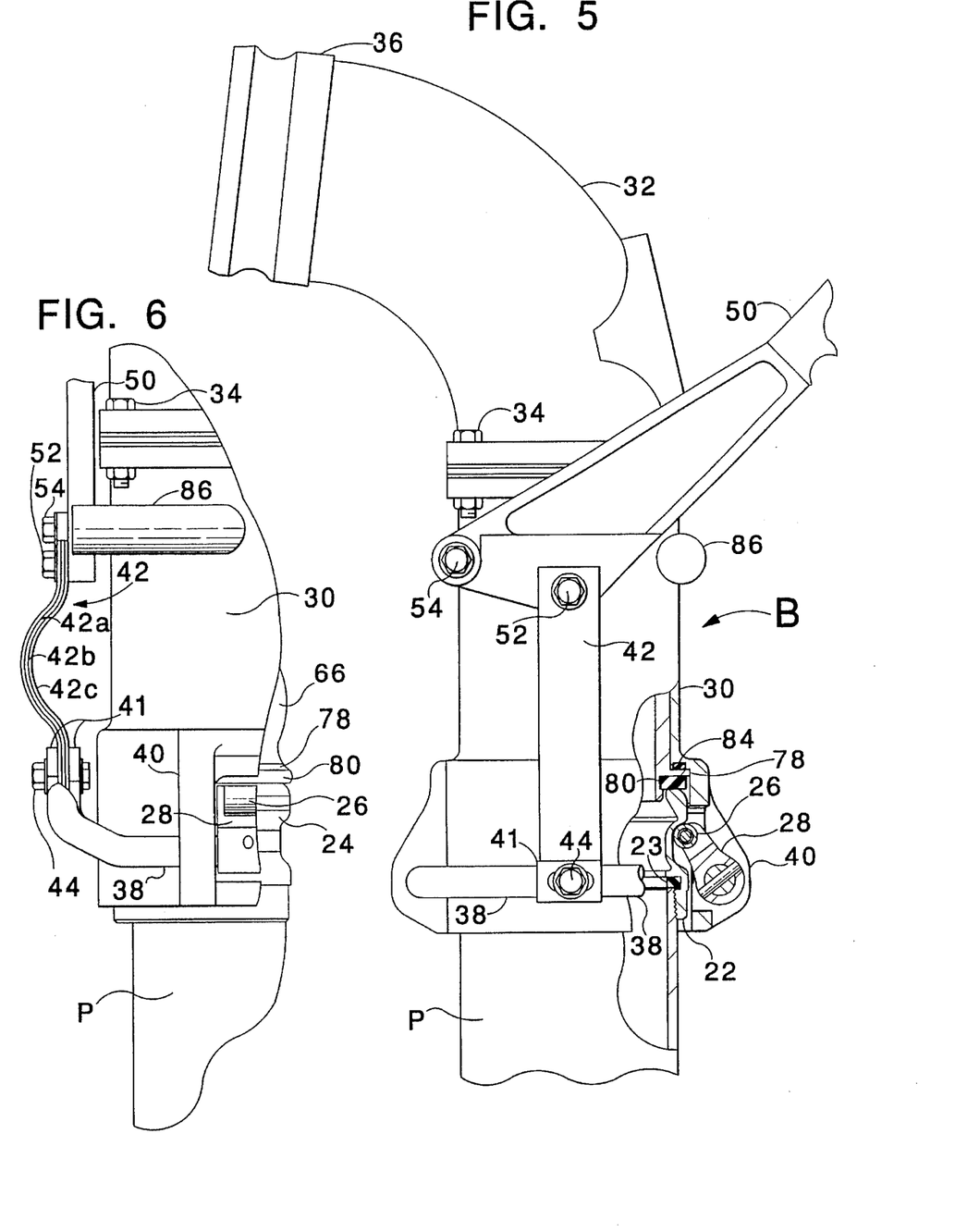
FIG. 5 is an elevation, partially in section, illustrating the coupler mounted in locked relation on the adapter.
FIG. 6 is a view, looking in the direction of arrow B in FIG. 5, illustrating deflection of a locking link when locking movement of coupler cam arms is impeded.
Figure 7:
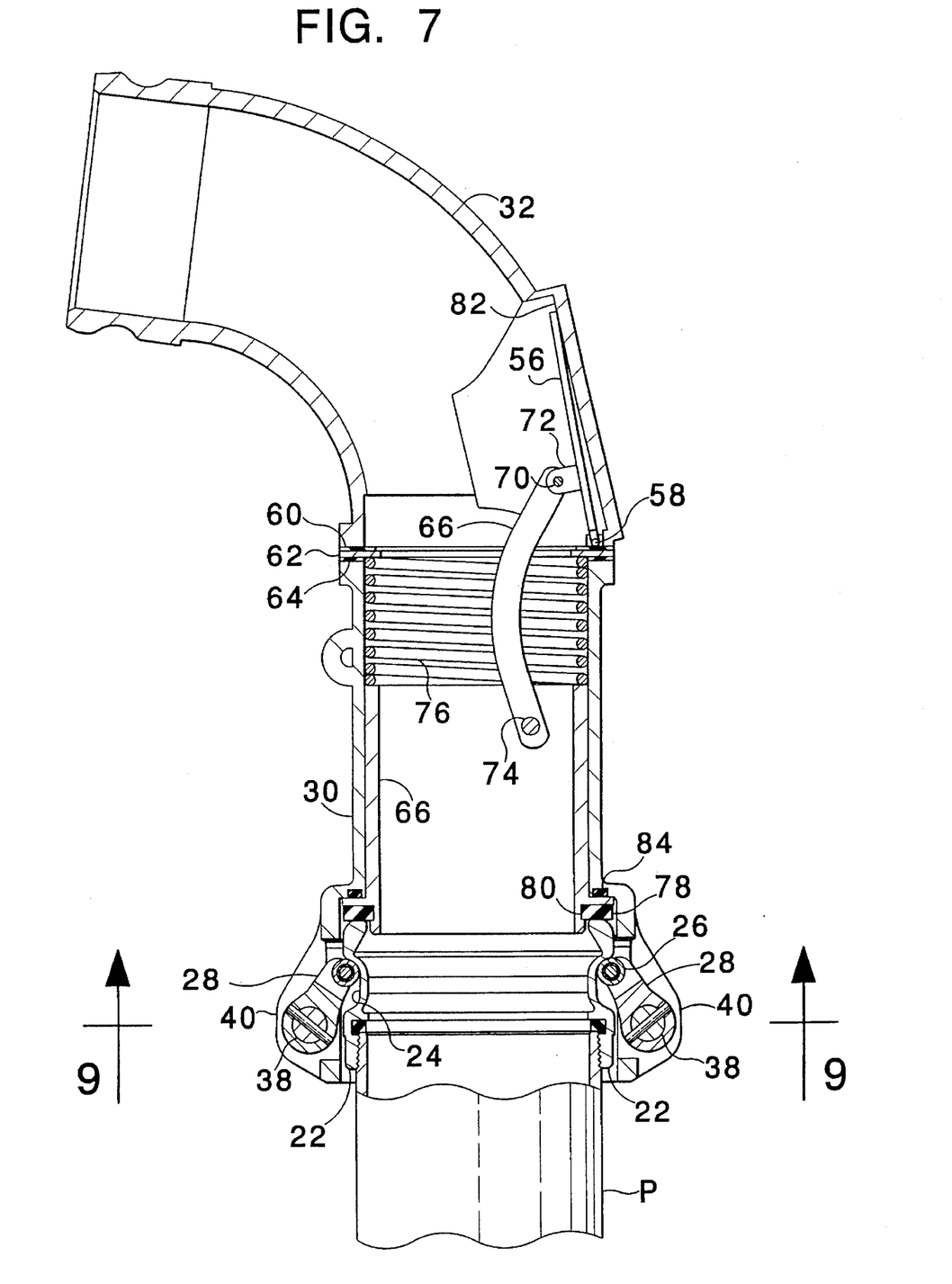
FIG. 7 is an elevation, in full longitudinal section, of the present coupler in locked relation on the adapter.

Thus if, under the stated condition of the rollers 26 being aligned with the enlarged upper end of the adapter 22, the lever 50 is swung to the locking position of FIG. 5, the link 42 deflects outwardly to the position of FIG. 6. It will be noted that a stop 86 underlies the lever 50 and limits its pivotal movement. By so limiting the pivotal movement of link 50, the maximum deflection of the link 42 is also limited and, likewise, the maximum stresses in the link 42 are limited so that it is not stressed beyond its elastic limit.

It is to be appreciated that the stop 86 is positioned so that the lever can be freely swung to a position in which the rollers 26 are lockingly engaged with the groove 24. Preferably, the stop 86 is slightly beneath this lever position and would not normally be engaged by the lever.

By establishing a maximum deflection for the link 42, it is possible to accurately determine the stresses that will be induced in the link. It is then possible to specify a link configuration which will not be overstressed, even after repeated maximum deflections, because of a failure of the rollers to properly seat in the groove 24. It has been found preferable to form the link 42 from a plurality of link plates 42a, 42b and 42c. More specifically the use of spring steel link plates is preferred in order to provide the desired column strength, while permitting sufficient lateral deflection, without exceeding the elastic limit of the individual plates. It is, of course, to be appreciated that a greater, or lesser, number of link plates can be used, dependent on the column strength and lateral deflection requirements of a given linkage system.

It is further preferable for the compositely formed link 42 to have a minimal, initial, lateral deflection, as indicated in FIG. 3. It has been found preferable that all of the link plates (42a, 42b, 42c) flex in the same direction, in order to minimize the possibility of dirt and debris getting therebetween and leading to a degradation of their strength characteristics. The initial deflection provided, assures that all of the plates will deflect in the same direction, when there is substantial deflection, as indicated in FIG. 6.

While the provision of a yieldable, resilient link connection through the use of a link that deflects laterally in column loading is preferred, the end of limiting the forces/stresses on the linkage system can also be attained by lost motion devices employing either compression or torsion springs, in accordance with the broader aspects of the invention.

It is also to be appreciated that, while the several features of the invention cooperate to provide safety locking means, i.e., means that guard against leakage of fuel at the connection between the coupler and adapter, certain of the features can be used independently of other features.

The foregoing and other variations from the preferred embodiment herein described will occur to those skilled in the art within the spirit and scope of the present inventive concepts, which are set forth in the following claims.

Having thus described the invention, what is claimed as novel and desired to be secured by Letters Patent of the United States is:

1. A coupler employed in connecting a hose to a stand pipe that extends upwardly from an underground storage tank, wherein
   the upper end of the stand pipe terminates within a containment device, and an adapter is at the upper end of the stand pipe and
   includes a circumferential locking groove, said coupler comprising
     a tubular housing, the lower end of which is adapted to be telescoped over the adapter,
     coupler locking means, mounted on opposite sides of the tubular housing, for lockingly engaging the locking groove of the adapter, and
     linkage means for bringing the coupler locking means into and out of locking engagement with said locking groove,
   said linkage means including an operating lever displaceable between
     a first position in which the coupler locking means are disengaged from the locking groove and
     a second position in which the coupler locking means are engaged with the locking groove, characterized by
   the linkage means including yieldable, resilient means for permitting the operating lever to be moved to its second position when the coupler locking means is blocked from engaging the locking groove of the adapter,
   said yieldable, resilient means limiting the stresses on the leakage means below a level which would curtail the working life of the linkage means.

2. A coupler as in claim 1, wherein
   the coupler locking means comprise a pair of pivotally mounted arms, and
   the operating lever is pivotally mounted on said housing, and
   the linkage means further include
     a pair of links extending, respectively, from said pivotally mounted arms into overlapping relation, at one side of the housing, and
     a longitudinal link extend between the operating lever and the overlapped portions of said pair of links,
     said longitudinal link being stressed in compression when the operating lever is swung from its first to its second position,
     further characterized in that
       said longitudinal link has a predetermined, maximum column strength,
       the predetermined column strength of the longitudinal link being sufficient to displace said pair of links and thereby swing said arms into locking engagement with the locking groove of the adapter, in response to movement of the operating lever from its first to its second position,
         when there is no impediment to either of said arms being swung into said locking engagement,
     said longitudinal link being laterally deflectable when the compression force thereon exceeds the column strength of the longitudinal link,
     said longitudinal linkage, when laterally deflected, transmitting a reduced force from the operating lever to the pair of links,
     whereby the maximum forces on the linkage means is limited to a finite value in the event one of the pair of arms is not free to be swung into locking engagement with the locking groove, and
   further wherein
     the components of tile linkage system are not overstressed when subject to said finite maximum value forces.

3. A coupler as in claim 1 wherein
   the linkage means include a connecting link, that is loaded in compression as the operating lever is moved from its first to its second position, and
   further characterized in that
     said connecting link has a limited column strength,
     when the compression force on said connecting link exceed the column strength of thereof, the connecting link deflects laterally, thereby limiting the forces that can be transmitted through the linkage means to a predetermined, maximum value,
     said connecting link, when deflected, being stressed within its elastic limit,
     said linkage means also being stressed within their elastic limits when stressed by the predetermined maximum value forces,
     whereby, if the operating lever is moved from its first to its second position, when the locking means is blocked from movement into locking engagement with the adapter locking groove, the linkage system remains operable.

4. A coupler as in claim 3,
   further characterized in that said connecting link
     is compositely formed, and
     comprises a plurality of link plates.

5. A coupler as in claim 4,
   further characterized in that
     the link plates are formed of spring steel having a small thickness compared to their widths and lengths and
     the link plates are disposed in side by side relation, with their adjacent surfaces being contiguous, and
   further characterized in that
     the link plates are initially curved to a small extent sufficient to assure that all will be deflected in the same direction, when the compression force thereon exceeds the column strength of the connecting link.

6. A coupler as in claim 4,
   further characterized by
     stop means for preventing the operating lever being moved substantially beyond its second position, to thereby limit the extent to which the connecting link can be deflected laterally.

7. A coupler as in claim 1, further characterized by
  yieldable blocking means having an extended position in which the coupler housing is prevented from being telescoped over the stand pipe adapter,
  said yieldable blocking means being displaceable, in response to longitudinal, downward pressure on the housing,
    to permit the housing to be telescoped over the stand pipe adapter, and
    to permit the housing to be displaced to a fully telescoped position, in which the linkage means may be actuated to bring the coupler locking means into locking engagement with the adapter locking groove,
  whereby the coupler will tend to fall from the stand pipe, unless manually held thereon, or locked thereon by the coupler locking means.

8. A coupler as in claim 4, wherein the tubular housing, has a counterbore in its lower end, said housing being telescopable over the adapter to position the adapter in the counterbore, the locking arms are pivotally mounted in diametrically opposed relation on the lower end of the housing,
  said arms each having a roller mounted at its free end, and
  having generally upright, locking positions in which the rollers engage a downwardly facing surface of the adapter groove, when the housing is in a fully telescoped position relative to said adapter, and, further, force the coupler housing downwardly, with respect to the adapter, and further characterized by
  a blocking member reciprocable within said counterbore,
  spring means for urging said blocking member to a blocking position preventing the housing from being freely telescoped over the adapter to an extent sufficient for the coupler to normally maintain an upright position, under the force of only the weight of the coupler,
  said spring means being yieldable to permit the housing to be displaced to its fully telescoped position, in response to a downward, manual force on the coupler, and further characterized in that
  said blocking member is disposed between the upper end of the adapter and the housing and is forced into sealing engagement with both, when the diametrically opposed arms are in their generally vertical, locking positions.

9. A coupler employed in connecting a hose to a stand pipe that extends upwardly from an underground storage tank, wherein the upper end of the stand pipe
  terminates within a containment device, and
  an adapter is at the upper end of the stand pipe and includes a circumferential locking groove, said coupler comprising
  a tubular housing, the lower end of which is adapted to be telescoped over the adapter,
  coupler locking means, mounted on opposite sides of the tubular housing, for lockingly engaging the locking groove of the adapter, and
  linkage means for bringing the coupler locking means into and out of locking engagement with said locking groove, characterized by
  valve means having
    an open position permitting flow of liquid through said housing, and
    a closed position preventing flow of liquid through said housing, and
  means, independent of said linkage means, for maintaining the valve means in its closed position when the coupler locking means is not in locking engagement with the locking groove of an adapter and for displacing the valve means to its open position when the coupler locking means is in locking engagement with the locking groove of an adapter.

10. A coupler employed in connecting a hose to a stand pipe that extends upwardly from an underground storage tank, wherein the upper end of the stand pipe
  terminates within a containment device, and
  an adapter is at the upper end of the stand pipe and includes a circumferential locking groove, said coupler comprising
  a tubular housing, the lower end of which is adapted to be telescoped over the adapter,
  coupler locking means, mounted on opposite sides of the tubular housing, for lockingly engaging the locking groove of the adapter, and
  linkage means for bringing the coupler locking means into and out of locking engagement with said locking groove, said linkage means being manually operable from a point above the containment device, characterized by
  yieldable blocking means having an extended position in which the coupler housing is prevented from being freely telescoped over the stand pipe adapter,
  said yieldable blocking means being displaceable, in response to longitudinal, downward pressure on the housing,
    to permit the housing to be telescoped over the stand pipe adapter, and
    to permit the housing to be displaced to a fully telescoped position, in which the linkage means may be actuated to bring the coupler locking means into locking engagement with the adapter locking groove,
  whereby the coupler will tend to fall from the stand pipe, unless manually held thereon, or locked thereon by the coupler locking means.

11. A coupler as in claim 10, further characterized by
  valve means having
    an open position permitting flow of liquid through said housing, and
    a closed position preventing flow of liquid through said housing, and
  means inter-connecting said valve means and said yieldable blocking means, said interconnecting means
  positioning said valve means in its closed position when the yieldable blocking means is in its extended, blocking position, and
  positioning said valve means in its open position, when the housing means is in its fully telescoped position.

12. A coupler employed in connecting a hose to a stand pipe that extends upwardly from an underground storage tank, wherein the upper end of the stand pipe terminates within a containment device, and an adapter is at the upper end of the stand pipe and includes a circumferential locking groove, said coupler comprising a tubular housing, having a counterbore in its lower end, said housing being telescopable over the adapter to position the adapter in the counterbore, a pair of locking arms pivotally mounted in diametrically opposed relation on the lower end of the housing, said arms each having a roller mounted at its free end, and having generally upright, locking positions in which the rollers engage a downwardly facing surface of the adapter groove, when the housing is in a fully telescoped position relative to said adapter, and, further, force the coupler housing downwardly, with respect to the adapter, and linkage means for swinging said locking arms into and out of locking engagement with said locking groove, characterized by a blocking member reciprocable within said counterbore, spring means for urging said blocking member to a blocking position preventing the housing from being freely telescoped over the adapter to an extent sufficient for the coupler to normally maintain an upright position, under the force of only the weight of the coupler, said spring means being yieldable to permit the housing to be displaced to its fully telescoped position, in response to a downward, manual force on the coupler.

13. A coupler as in claim 12, wherein the counterbore has a base at its upper end, and further characterized in that the blocking member is in the form of an annular member, and further in that the blocking member sealingly engages an upper, radial end face of the coupler, and the base of said counterbore when the locking arms are in their generally vertical, locking positions, to thereby provide a sealed connection between the housing and the adapter.

14. A coupler as in claim 12, wherein the counterbore has a base at its upper end, and further characterized by a tubular sleeve slidably mounted in the lower end of the housing, and having an outwardly projecting flange, at its lower end, that provides the blocking member, and further wherein the flange, that projects from the sleeve, sealingly engages an upper, radial end face of the adapter, and the base of said counterbore, when the locking arms are in their generally vertical, locking positions, to thereby provide a sealed connection between the housing and the adapter.

15. A coupler as in claim 14, wherein the housing is compositely formed, comprises an upper portion and a lower portion, and means joining the upper and lower portions, and the counterbore is formed in the lower end of the lower housing portion, further characterized by an annular valve seat disposed at the juncture between the upper and lower housing portions, and a flapper valve, pivotally mounted at the juncture between the housing portions, and having a closed position in which the flapper valve engages the valve seat and prevents flow of liquid through the housing and a fully open position disposed to one side of the passage, and means interconnecting the sleeve and the flapper valve to position the flapper valve in its closed position when the sleeve flange is in its blocking position, and to position the flapper valve in its fully open position when the housing is in its fully telescoped position.

16. A coupler as in claim 15, further characterized in that the spring means comprise a compression spring disposed between an upper, annular face on the sleeve and a lower surface of the valve seat.

17. A coupler as in claim 16, further characterized in that the means interconnecting the sleeve and the flapper valve comprises a link pivotally connected to the lower surface of the flapper valve, and a pin, spanning said sleeve, to which the link is pivotally connected.

18. A coupler as in claim 16 wherein the lower housing portion defines an essentially straight liquid passage, and the upper housing portion defines liquid passage that curves through an angle of approximately 90°.

19. A coupler as in claim 18, wherein the upper housing a curved surface formed on an inner radius and an outer radius, and further characterized by a recess formed in the curved surface formed on the outer radius, and by the flapper valve, in its fully open position, being disposed in said recess.

20. A coupler as in claim 14, wherein the linkage means include an operating lever that is pivotally mounted on said housing, and a pair of links extending, respectively, from said pivotally mounted arms into overlapping relation, at one side of the housing, and a longitudinal link extends between the operating lever and the overlapped portions of said pair of links, said longitudinal link being stressed in compression when the operating lever is swung from its first to its second position, further characterized in that said longitudinal link has a predetermined, maximum column strength sufficient to displace said pair of links and swing said arms into their generally upright, locking positions,
   in response to movement of the operating lever from its first to its second position,
   when there is no impediment to either of said arms being swung to its generally upright, locking position,
said longitudinal link being laterally deflectable when the compression force thereon exceeds the column strength of the longitudinal link, whereby the maximum forces on the linkage means is limited to a finite value in the event one of the pair of arms is not free to be swung to its generally upright, locking position, and
further wherein
   the components of the linkage system are not overstressed when subject to said finite maximum value forces.

\* \* \* \* \*

UNITED STATES PATENT AND TRADEMARK OFFICE
CERTIFICATE OF CORRECTION

PATENT NO. : 5,535,984

DATED : July 16, 1996

INVENTOR(S) : Todd W. Anderson et al.

It is certified that error appears in the above-identified patent and that said Letters Patent is hereby corrected as shown below:

Column 2, line 53, delete "all"

Column 2, line 53, after "Yet", insert --another--.

Column 10, line 21, delete "tile".

Column 10, line 21, after "of", insert --the--.

Signed and Sealed this

Fourth Day of March, 1997

*Attest:*

BRUCE LEHMAN

*Attesting Officer*  Commissioner of Patents and Trademarks